Fig. 1.

June 14, 1960    J. C. DRADER    2,940,365
CONTROL APPARATUS

Filed Aug. 10, 1955    9 Sheets-Sheet 3

INVENTOR.
Joseph C. Drader
BY
Harness, Dickey & Pierce
ATTORNEYS

Fig. 5.

June 14, 1960  J. C. DRADER  2,940,365
CONTROL APPARATUS

Filed Aug. 10, 1955  9 Sheets-Sheet 5

INVENTOR.
Joseph C. Drader
BY
Harness, Dickey & Pierce
ATTORNEYS.

FIG. 10.

June 14, 1960 J. C. DRADER 2,940,365
CONTROL APPARATUS
Filed Aug. 10, 1955 9 Sheets-Sheet 9

INVENTOR.
Joseph C. Drader
BY
Harness, Dickey & Pierce
ATTORNEYS

United States Patent Office 2,940,365
Patented June 14, 1960

2,940,365

CONTROL APPARATUS

Joseph C. Drader, Grosse Pointe, Mich., assignor to Michigan Tool Company, Detroit, Mich., a corporation of Delaware Filed Aug. 10, 1955, Ser. No. 527,488

2 Claims. (Cl. 90—4)

The present invention relates to control apparatus and, more particularly, to improved apparatus for controlling gear cutters, gear hobbing machines, gear shaping machines, gear grinding machines, gear shaving machines and other gear producing and finishing machines.

Heretofore, gears and the like have been mass-produced by automatic machines which performed the necessary series of machining operations on a succession of workpieces supplied thereto by automatic feeders and loading machines. Automatic gear producing machines of the indicated character operate at relatively high speeds and, in the event the cutting or shaping tools of the machine become worn, damaged or otherwise unserviceable, or if the machine becomes maladjusted or is incorrectly adjusted initially, a material quantity of oversize, undersize, or otherwise incorrectly dimensioned gears may be produced before the malfunction is discovered and corrected. Heretofore, non-concentricity and small variations in lead angle were particularly difficult to detect and frequently were not detected until the gears were assembled into a final product.

An object of the present invention is to overcome disadvantages in prior gear producing and gear finishing machines of the indicated character and to provide improved control apparatus incorporating improved means for controlling a gear producing machine.

Another object of the invention is to provide improved apparatus incorporating improved means for gauging finished gears.

Another important object of the invention is to provide improved control apparatus incorporating improved means for controlling a gear producing machine as a function of the dimensions of gears produced by the machine.

Another object of the invention is to provide improved control apparatus incorporating improved means for controlling a gear producing machine as a function of the number of incorrectly dimensioned gears consecutively produced by the machine.

Another object of the invention is to provide improved means for detecting tool breakage or other maladjustment of a gear producing machine.

Another important object of the invention is to provide improved apparatus for controlling the operation of automatic gear producing machines, which apparatus incorporates improved means for separating correctly dimensioned gears from improperly dimensioned gears and integrating quality controls for stopping the producing machine when the percentage of rejects rises above a predetermined value.

Yet another object of the invention is to provide improved control apparatus incorporating improved means for adjusting a gear producing or finishing machine as a function of measured dimensions of gears produced by the machine.

Still another object of the invention is to provide improved control apparatus that is economical to manufacture and assemble, durable, efficient and reliable in operation.

In the accomplishment of these objects, the present invention provides an improved gear classifier which is adapted to detect undersize, oversize and non-concentric gears, and which is also adapted to detect gears having an incorrect (plus or minus) helix angle. The present invention also provides control means for use in conjunction with the aforementioned and other gear classifiers, which control means includes means for separating improperly dimensioned gears from correctly dimensioned gears, means for counting the number of consecutively produced reject gears and the number of such incorrectly dimensioned gears produced in a given time interval, means for stopping the gear producing machine when the number of consecutive rejects or the percentage of reject gears is above a predetermined value, means for automatically adjusting the gear producing machine as a function of errors detected by the gear classifier, and means for stopping the gear producing machine when gears having an incorrect helix angle are produced thereby.

It is a feature of the present invention that one or more master gears are provided which are movably mounted whereby when gear workpieces are brought into intermeshing contact therewith, the gear workpieces will move the master gear or gears. It is also a feature of the present invention that means is provided for sensing movement of the master gear or gears and translating such movement to actuate various classifier means, integrating quality control means, machine adjustment means, and various emergency shut-down circuits.

Other objects and advantages of the present invention will become apparent from the following description, the appended claims and the accompanying drawings wherein:

Referring to the drawings, the present invention is shown incorporated in apparatus which is shown in installed relationship with respect to a gear hobbing machine of the type disclosed and claimed in the copending application of Alexander D. F. Moncrieff, Serial No. 466,481, filed November 3, 1954, now Patent No. 2,839,968, June 24, 1958, and assigned to the assignee of the present invention, although it will be understood that the present invention is applicable to other uses. For example, the present invention may be applied to other types of gear producing and finishing machines.

Hobbing machines of the type illustrated include a base 10 on which is mounted a headstock 12 and a tailstock 14. The headstock is driven by a shaft 16 operatively connected to a ratio gear box 18, the gear box 18, in turn, being driven by a shaft 20 and main drive gears housed in a gear box 22. The speed at which the headstock 12 and hob (not shown) are driven is determined by change gears (not shown) accessible through a cover 24 on the right side of the gear box 22, as viewed in Fig. 1. The gears in the box 22 are driven by a main drive motor 26 located on the top of gear box 22, as viewed in Fig. 1.

The hob is mounted for rotation on a generally vertical axis, as contrasted with the horizontal tailstock-headstock axis, by a head mechanism, generally designated 28, the hob arbor itself (not shown) being carried by a hob spindle 30. A hob carrier head 31 is provided which carries the spindle 30 and the carrier head 31 is mounted for rotation on a plate 32 so that the hob spindle 30 and its arbor may be set at the gear helix angle. The hob spindle 30 and arbor are rotatably mounted on a cross-feed or side feed slide indicated generally by the numeral 34, the latter enabling the hob to be side-fed on an angular path to generate the final tooth form. The hob spindle 30 also may be rotated relative to the cross-feed slide 34 about a pivot plate 36 so that the hob may be side fed at the correct lead angle.

Figure 2:
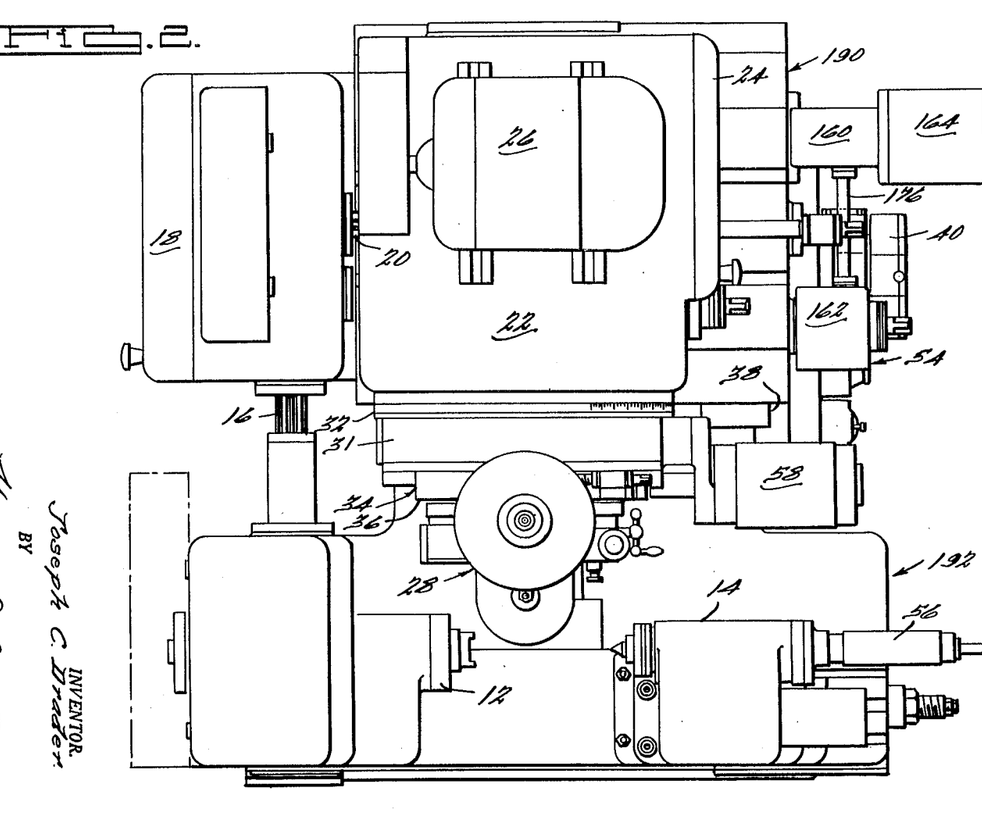
Fig. 2 is a plan view of the gear hobbing-machine shown in Fig. 1 with the parts feeder and gear classifier removed, this figure showing in particular apparatus for automatically readjusting the in-feed mechanism of the hobbing machine.

Infeeding of the hob spindle 30 and its arbor is accomplished by a mechanism housed in the base 10, which mechanism moves the entire gear box 22 and the head assembly 28 toward and away from the headstock-tailstock axis, as more fully described in the aforementioned copending application. As shown in Fig. 2, this movement is accomplished on a slide 38 disposed below the gear box 22, while a slide 40 is provided for positioning the hob spindle 30 at the correct side-to-side transverse position relative to the work. The slides 38 and 40, therefore, constitute a compound slide disposed below the gear box 22.

Figure 1:
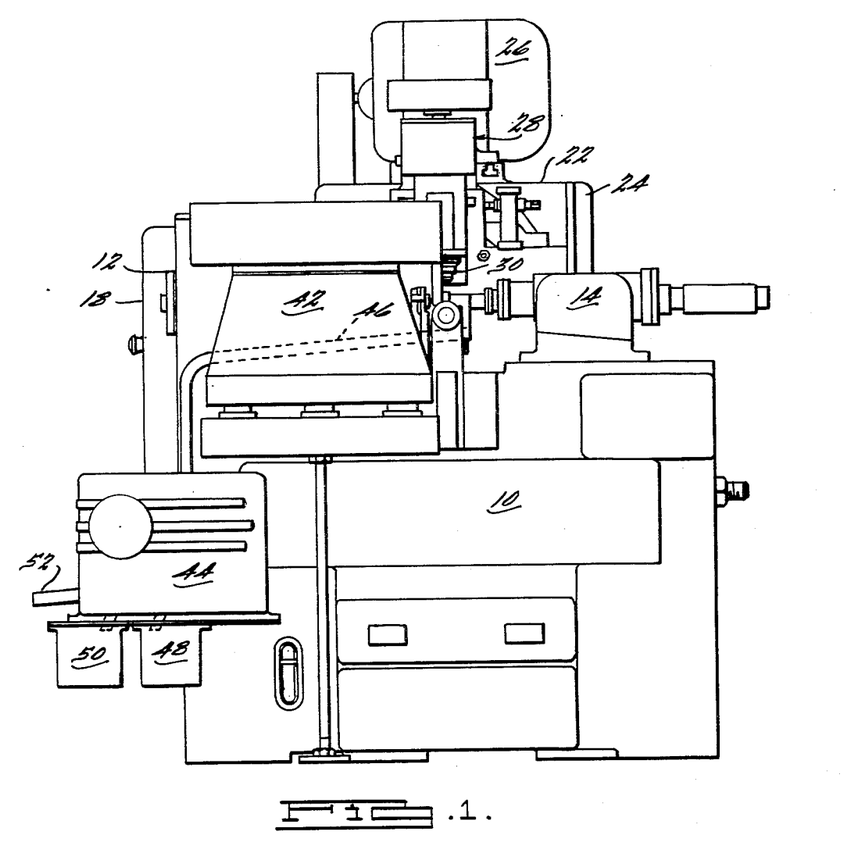
Figure 1 is a front elevational view of an automatic gear hobbing machine, showing one embodiment of the invention in installed relationship with respect thereto.

As shown in Fig. 1, the hobbing machine is also provided with a parts feeder and ejector mechanism, generally designated 42, of the vibratory type which serves to feed gear blanks to the hob, finished gears being conducted away from the hob through a passageway 46. The tailstock 14 is power-operated by means of a fluid-actuated piston and cylinder unit 56 so that the loader and ejector can insert gear blanks and remove finished gears. Side-feed of the hob is automatically accomplished by a fluid actuated piston and cylinder unit 58 operatively connected to the side-feed slide members 34.

In accordance with the present invention, a gear classifier, generally designated 44, is provided which receives the finished gears from the passageway 46 and which functions to gauge, separate and distribute the gears to receptables, such as 48 and 50 or to receptacles placed under outlet guideways, such as 52. As shown in Figs. 2, 5, 6 and 7, an auxiliary automatic infeed adjusting mechanism, generally designated 54, is also provided, which will be described hereinafter in greater detail.

Figure 3:
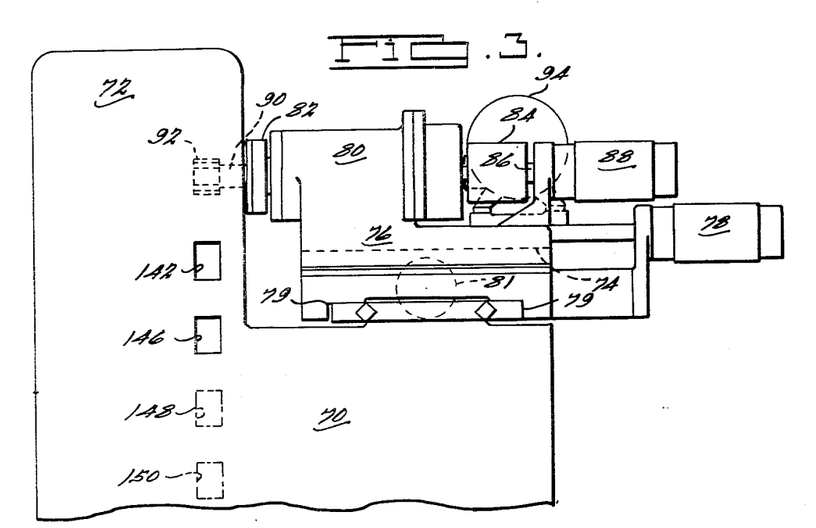
Fig. 3 is a front elevational view of a gear classifier embodying the present invention.
Figure 4:
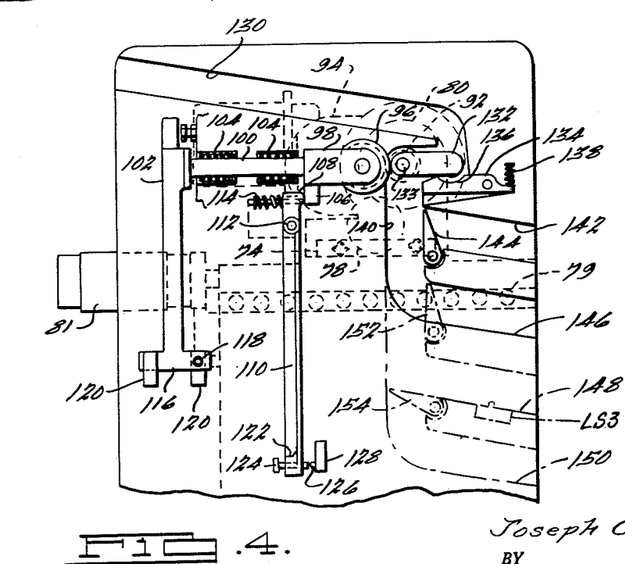
Fig. 4 is an end view of the gear classifier shown in Fig. 3, with the end wall removed therefrom.

As shown in Figs. 3 and 4, the gear classifier 44 includes a housing 70 having a head portion 72 which houses the gauging apparatus. Mounted on a slide 74 on the housing 70 is a carriage 76 which is reciprocally moved toward or away from the vertical head portion 72 by a double-acting fluid actuated piston and cylinder unit 78. The carriage 76 is also mounted on a transverse slide 79 and adapted to be reciprocated thereon by a double-acting piston and cylinder unit 81. The carriage 76 includes an upstanding headstock portion 80 in which is mounted a reciprocal ram operated, rotatable spindle 82 having one end portion thereof connected to a rotary coupling 84, the coupling 84, in turn, being connected to the piston rod 86 of a double-acting piston and cylinder unit 88. An expandible arbor 90 is connected to the spindle 82, the arbor 90 being adapted to receive a gear workpiece 92. The rotary coupling 84 is driven by a direct coupled gear reducer electric motor unit 94 connected thereto at substantially right angles in the embodiment of the invention illustrated, and the spindle 82 and the expandible arbor 90 are driven by the electric motor 94 operating through the rotary coupling 84. The piston and cylinder unit 78 functions to move the carriage 76 and the spindle 82 into and out of the gauging head 72 while the piston and cylinder unit 81 functions to move the carriage 76 and the spindle 82 in a transverse direction so as to move the gear workpieces 92 into and out of intermeshing engagement with a pivotally-mounted, freely rotating master gear 96 mounted inside the head 72.

In this embodiment of the invention, the master gear 96 is mounted for combined translatory and pivotal movement and is adapted to operate a pair of switch arms arranged to move at substantially right angles to each other. This is accomplished by mounting the master gear on a bifurcated mounting member 98 which, in turn, is fixed to one end portion of a shaft 100. The opposite end portion of the shaft is provided with a switch arm 102 and the shaft 100 is slidably supported in bearings 104 for longitudinal movement relative to the gear workpiece 92. When the shaft 100 moves longitudinally, a projecting bracket 106 on the mounting 98 makes contact with the end 108 of a second pivotally-mounted arm 110, the arm 110 being pivotally mounted on a shaft 112 and being biased by a spring 114 bearing on the end 108 of the arm.

The arm 102 includes a generally T-shaped head portion 116 which carries switch arms 118 adapted to engage a plurality of microswitches generally designated 120 which serve to sense movement of the arm 102 and operate appropriate controls, as will be described hereinafter in greater detail. In this embodiment of the invention the arm 102 and switches 120 function to detect incorrect helix angle on the gear workpieces 92 as a function of the angular movement of the master gear 96 about the axis of the shaft 100. It will be understood by those skilled in the art that the master gear 96 will tend to align itself with the teeth of the gear workpiece, thereby imparting a rotational movement to the mounting member 98 and the shaft 100. The arm 102 is swung by such movement in a greater or lesser arc so as to actuate one or more of the switches 120, the gear workpiece 92 being accepted or rejected according to the magnitude of the angular movement imparted to the arm 102 and the tolerance allowed by the location and adjustment of the switches 120.

The arm 110 includes a generally T-shaped head portion 122 which carries switch arms 124 that contact the upstanding plungers 126 of a plurality of microswitches, generally designated 128, the pivotal movement of the arm 110 about the shaft 112 being translated into electrical impulses which operate accepting or rejecting controls and, if desired, a center distance adjusting control circuit or other machine adjusting circuit. In this embodiment of the invention, the movements of the arm 110 correspond to the center distance between the master gear 96 and the gear workpieces 92. The gear workpieces 92 are preferably rotated at least through one complete revolution by the motor 94 in order that all of the teeth of the workpieces may be checked and to enable the arm 110 to detect non-concentric gears wherein the gear teeth are not all equidistant from the rotational center. It will be appreciated that when the gear workpieces are non-concentric, the center distance will be incorrect. The arm 110 will also detect incorrect tooth profile and incorrect tooth spacing, such improper dimensions appearing as an improper center distance when the master gear and gear workpiece are in mesh. During the revolution of the gear workpiece 92, a non-concentric gear will register either as an undersize or as an oversize gear, depending on which part of its circumference first engages the master gear. While oversize gears are generally salvageable and undersize are usually scrapped, it will be appreciated that a portion, at least, of the non-concentric gears and the gears having incorrect helix angle, incorrect tooth spacing or incorrect tooth profile may usually be salvaged by reworking.

In operation, the gear workpieces are fed to the gear classifier by a vibratory parts feeder, a loader and an ejector (not shown), the latter device being adapted to successively deliver gear workpieces to a passageway 130 in the gear classifier, so that each of the gear workpieces rolls freely down the passageway 130 until it makes contact with an outwardly projecting finger 132 pivotally mounted on a shaft 133. The weight of the gear workpiece depresses the finger 132 and a pivotally-mounted anvil 134 in contact therewith. The gear workpiece then follows down the finger 132 to settle into a curved depression 136 in the anvil 134 in which position it is held ready to receive the arbor 90, the finger 132 abutting the gear during the insertion of the arbor. When the arbor is expanded in the bore of the gear and the cylinder 81 actuated to move the gear off the anvil 134, the gear depresses the anvil 134 and the finger 132 and the gear workpiece 92 moves into engagement with the master gear 96. After the gear 92 disengages the arm 132, the return biasing spring 138 returns the anvil 134 and the arm 132 to their original position ready to receive the next gear workpiece.

The sequence of operations performed by the gear classifier is as follows. The piston and cylinder unit 78 moves the spindle carriage 76 inwardly injecting the work arbor 90 into the gear, after which the piston and cylinder unit 88 expands the arbor to hold the part. The piston and cylinder unit 81 then moves the spindle carriage 76 to the checking position, and, at the same time, the motor 94 rotates the gear in contact with master gear 96. After an interval sufficient to allow at least one complete revolution of the sample gear, the piston and cylinder unit 88 operates to release the gear workpiece, and the piston and cylinder unit 78 withdraws the arbor from the gear, the latter rolling or falling down the vertical passageway 140. The piston and cylinder unit 81 then returns the spindle carriage 76 to the initial position.

The gear workpieces 92, having been checked and released by the arbor 90, roll into the vertical passageway 140 which communicates with four connecting chutes 142, 146, 148 and 150. At the intersection of vertical passageway 140 with the chutes 142 and 146, gates 144 and 152 are provided which are normally erect so as to close off such chutes, and at the intersection of chute 150 with the vertical passageway, a gate 154 is provided which normally closes off the chute 150. If the helix angle of the gear is incorrect, suitable limit switches are closed to effect the opening of the gate 144 (i.e., move it to the horizontal position) to guide the gear into the chute 142. If the gear workpiece is undersize, no limit switches are closed by the arms 102 and 110, and the normal positions of the gates 144 and 152 guide the gear into the undersize chute 148 where the gear engages and closes a limit switch LS3, shown in Figs. 4 and 8. When correctly dimensioned gears pass through the classifier, limit switches close to effect the actuation of the gate 152 so that the gate 152 guides the gear into the chute 146. Oversize gears also close limit switches causing the gate 154 to move and close off the chute 148, thereby allowing the gear to roll out the chute 150.

While in this embodiment of the invention the gears are classified into four categories, it will be understood that the selector is capable of finer classification. For example, the oversize and undersize limit switches could be integrated so that when a non-concentric gear successively actuates them within a given time interval, the non-concentric gear would be caused to move into a separate chute without operating the readjusting circuit described hereinafter in greater detail. Other controls could be provided, if desired. It is to be understood that the limit switches can be so placed and adjusted to detect very small variations in the gear workpieces. For example, the gear classifier may be used to control the operation of gear finishing machines and to compensate for tool wear and temperature fluctuations during operation.

The gear classifier of this embodiment of the invention detects non-concentricity by means of a quality control and/or a consecutive reject control circuit which stops the producing machine in the event that a predetermined proportion of the gear blanks are bored off center, non-concentric gears being classified as undersize or oversize, depending on which portion of the periphery of the gear workpiece first engages the master gear.

Figure 5:
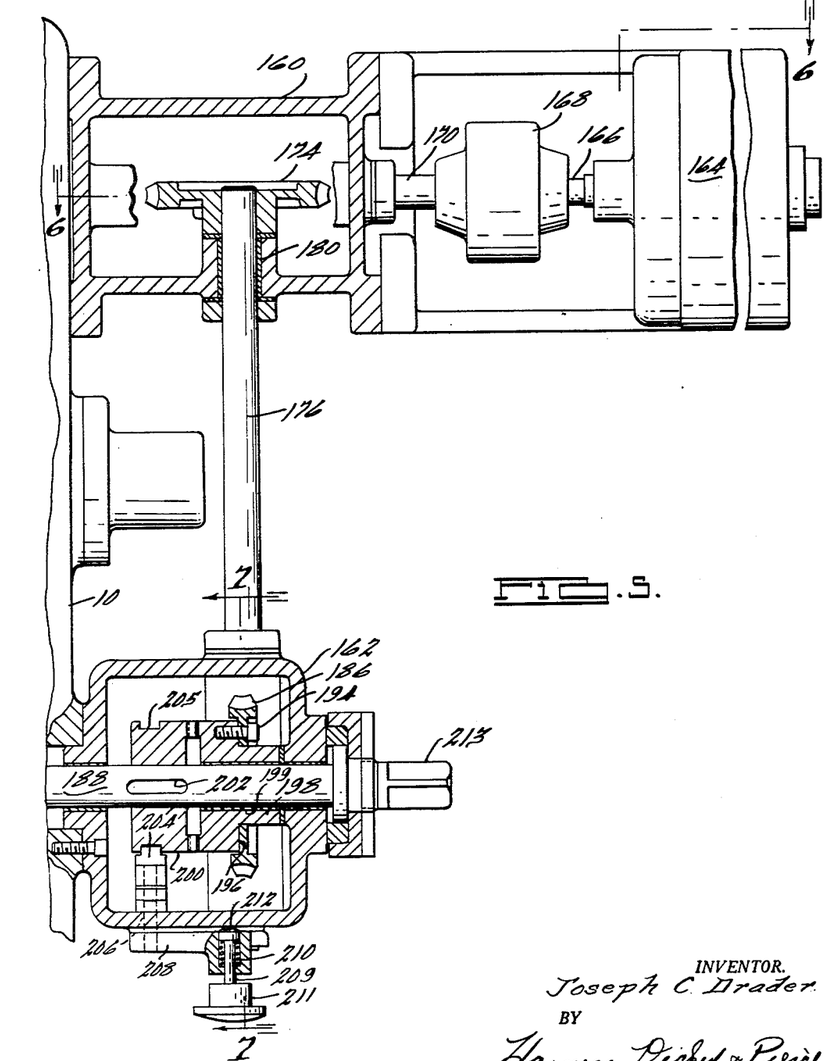
Fig. 5 is a plan view, with portions in section, of apparatus embodying the invention for automatically adjusting the hob-gear blank center distance on the hobbing machine of Figs. 1 and 2.
Figures 6, 7:
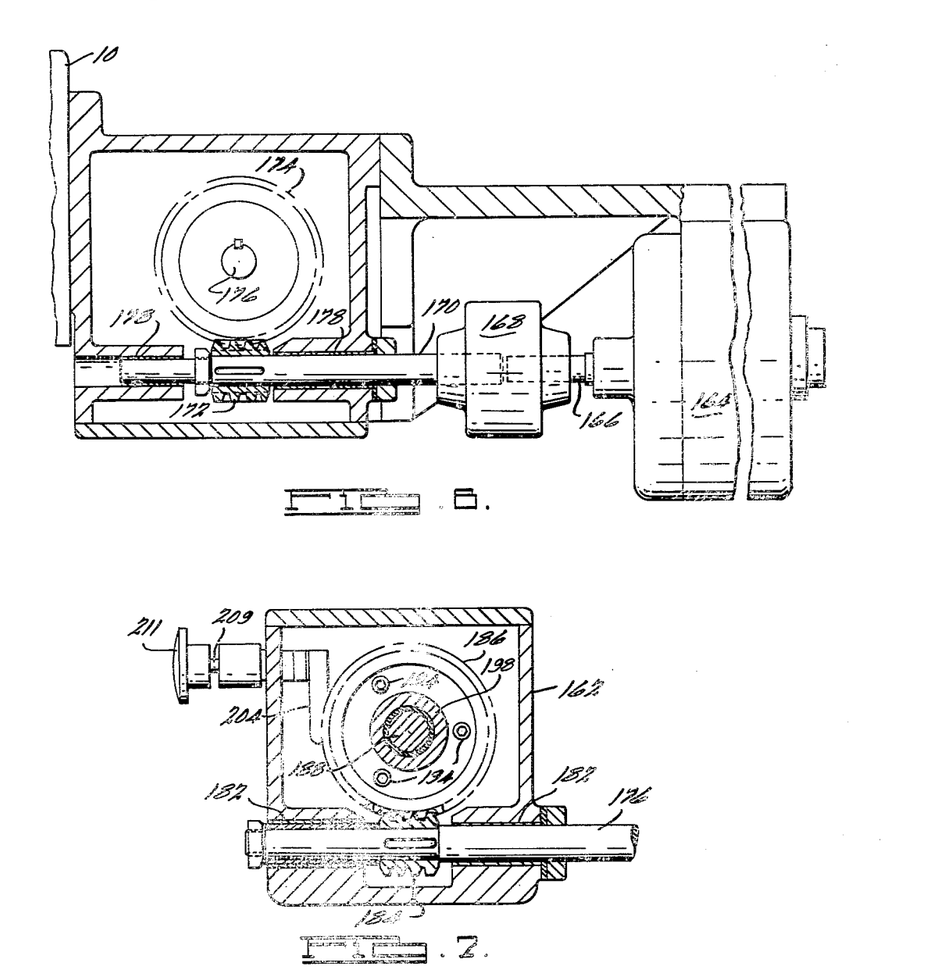
Fig. 6 is an elevational view, with portions in section, of the structure illustrated in Fig. 5, taken on the line 6—6 thereof.
Fig. 7 is a sectional view of the structure illustrated in Fig. 5, taken on the line 7—7 thereof.

As shown in Figs. 2 and 5 to 7, the hobbing machine is provided with an electric motor driven infeed mechanism which is comprised of a pair of accessory bracket housings 160 and 162 fixed to the right side of the hobbing machine base 10, as viewed in Fig. 2. Mounted on the housing 160 is a direct coupled electric motor and gear reducer unit 164, the gear reducer shaft 166 being connected through a coupling 168 to a shaft 170. As shown in Fig. 6, the shaft 170 is provided with an integral worm 172 which meshes with a gear 174 carried by a shaft 176, the shaft 170 being journaled in bearings 178 housed in bearing bosses located in the housing 160. One end of the shaft 176 is supported in bearings 180 mounted in the housing 162 while the other end of the shaft 176 is supported in bearings 182 mounted in the housing 162.

As shown in Fig. 7, a worm 184 is keyed to the shaft 176, the worm 184 meshing with a gear 186 carried by a shaft 188 which extends into the machine base 10. The shaft 188 carries on its base-included end a worm which engages a gear carried by the infeed screw shaft of the hobbing machine, the infeed screw shaft extending from the back leg 190 of the generally T-shaped base 10 to the front 192 thereof, as more fully described in the aforementioned copending application. The gear 186, it should be noted, is not mounted directly on shaft 188 but rather is fixed by bolts 194 to a shoulder 196 on an idler ring-faced clutch gear 198 which is free to rotate on bearings 199 interposed between the gear and the shaft 188. The teeth of the gear 198 mesh with a similar ring-faced clutch gear 200 which is keyed to shaft 188. The gear 200, however, is fixed to the shaft 188 so as to be movable on keys 202 into and out of engagement with the gear 198. This movement is accomplished by means of a cam follower arm 204 adapted to fit in an annular groove 205 in the outer surface of the gear 200, the arm 204 being connected to a shaft 206, as shown in Fig. 5, which extends outwardly through the housing 162 for connection to a handle lever 208. The lever 208 includes a spring biased shaft 209 secured in a handle 211 and provided with a return spring 210. The shaft 209 is normally urged into a locking recess 212 in the outer surface of the housing 162 to keep the clutch gears 198 and 200 locked in engagement. When the handle 211 is pulled out of the recess 212, the lever 208 can be moved down to move the follower arm 204 to one side and disengage the clutch gears 198 and 200. The just described clutching means permits disengagement of the drive shaft 176 during setting-up of the hobber, manual infeed adjustment of the infeed mechanism being accomplished by placing a handle or wrench over the squared outer end 213 of shaft 188.

Figure 8:
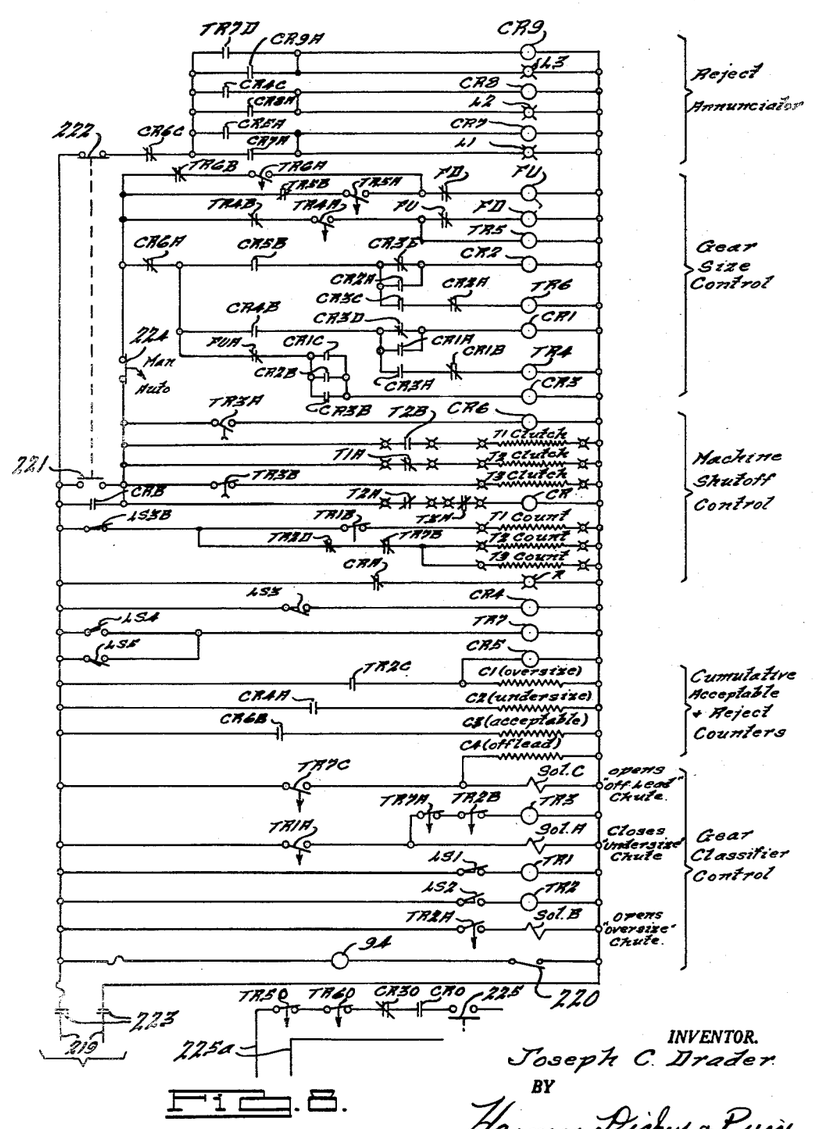
Fig. 8 is a schematic diagram of an electrical controls system embodying the present invention.

An electrical controls system is diagrammatically shown in Fig. 8, and is comprised of a reject annunciator system (lamps L1, L2 and L3), a gear size control or infeed "in-out" control, a machine shut-off control, a cumulative (visual) acceptable-reject counting system (counters C1 to C4), and controls for the gear classifier illustrated in Figs. 3 and 4. The controls system is electrically connected to a suitable source of potential by supply lines 219. The gear classifier is actuated by closing switches 220, 221, and 223, the switch 220 being in series with the classifier drive motor 94. A start-stop switch 225 is also provided for the hobbing machine, the switch 225 being interposed in a circuit that includes supply lines 225a which are connected to a suitable source of potential and which serve to energize the hobbing machine or other machine being controlled. A size control switch 224 is also provided, and when the switch 224 is closed, the hobbing machine or other gear producing machine operates on an automatic cycle controlled by the automatic controls system connected to the main control relay CR.

Energization of the control relay CR by closing of the switch 221 extinguishes a warning lamp "R" (machine stop warning) through opening of normally closed contacts CRA and locks in the relay CR through closure of contacts CRB. Switch 222 then closes to connect the annunciator circuits to the source. Closure of the contacts CRB also energizes count relay clutch coils T2 and T3 through the normally closed contacts T1A and TR3B, respectively. T2 clutch coil, in turn, energizes T1 clutch coil through closure of the contacts T2B. The controls system is then ready to operate.

The gear classifier controls circuit includes limit switches LS1 and LS2 (switches 128, Fig. 4) associated with the arm 110; limit switches LS3 disposed in the undersize reject chute 148; limit switches LS4 and LS5 associated with arm 102 (switches 120, Fig. 4); solenoids A, B and C which actuate, respectively, gates 152, 154 and 144; and conventional timing relays TR1 through TR7. Closure of the limit switch LS1 energizes the timing relay TR1, the latter then energizing the timing relay TR3 and the solenoid A through closure of contacts TR1A and de-energizing relay T1 count coil through the opening of contacts TR1B. Closure of the limit switch LS2 energizes the timer relay TR2, the latter then energizing the solenoid B through closure of contacts TR2A, de-energizing the relay TR3 through opening of contacts TR2B, energizing the relay CR5 and counter C1 through closure of contacts TR2C, and de-energizing the count relay count coil T2 through opening of contacts TR2D. Closure of the limit switch LS3 by an undersized gear workpiece energizes relay CR4 and de-energizes relay count coils T1, T2 and T3 through the opening of contacts LS3B. Closure of the limit switch LS4, by a gear having plus helix angle error, energizes the timer relay TR7 and the latter energizes solenoid C through closure of TR7C contacts. Closure of the limit switch LS5 by a gear having minus helix angle correction also energizes the timer relay TR7 to energize the solenoid C through closure of the TR7C contacts.

Energization of the relay CR4 by closure of limit switch LS3 energizes counter C2 through closure of contacts CR4A, energizes relay CR1 through closure of contacts CR4B, CR1, in turn, energizing relay CR3 through closure of contacts CR1C. Relay CR3 then interrupts the machine cycle while the workpiece is ejected by opening the contacts CR3O. Relay CR4 also energizes annunciator relay CR8 and lamp L2 through closure of contacts CR4C, relay CR8 locking in through closure of contacts CR8A. Relay CR3 establishes its own holding circuit through closure of contacts CR3A.

Energization of the timer relay TR3 effects closure of the contacts TR3A to energize the relay CR6, and de-energizes the count relay clutch coil T3 through opening of contacts TR3B.

Energization of the relay CR5 effected by the closure of the contacts TR2C energizes the relay CR7 and lamp L1 through closure of the contacts CR5A; relay CR7 locking in through closure of contacts CR7A, and energizes relay CR2 through closure of contacts CR5B. Energization of the timer relay TR7 de-energizes the timer relay TR3 through opening of contacts TR7A, de-energizes relay count coils T2 and T3 through opening of contacts TR7B, energizes counter C4 and solenoid C through closure of contacts TR7C, and energizes relay CR9 and lamp L3 through closure of contacts TR7D. Relay CR9 locks in through closure of contacts CR9.

Energization of the relay CR6 by the closure of contacts TR3A of relay TR3 de-energizes the relay CR2, timer relay TR6, relay CR1, timer relay TR4, and relay CR3 through opening of contacts CR6A, energizes counter C3 through closure of contacts CR6B, and extinguishes the reject annunciator circuit through opening of contacts CR6C.

The above action of the limit switches and timing relays is registered on the cumulative, acceptable and reject counters through contacts TR2C, CR4A, CR6B and TR7C. Counters C1 through C4 allow the operator to record the total of the gears produced by totaling the readings to gain a quick check and record of the operations.

The machine shut-off control is actuated by count relays T1, T2 and T3 which each have a clutch coil and a count coil. The count relay T2 can de-energize control relay CR through timer relay TR3 by counting out and opening contacts T2A before count relay T1 counts out. If consecutive rejects occur for whatever reason, the count relay T3 also can de-energize the control relay CR by opening the contacts T3A. In either case, the producing machine is stopped by the opening of the contacts CRO and the lamp R is energized by closure of the contacts CRA. If an acceptable gear passes, however, contacts TR1A maintain energization of timer relay TR3 and the latter resets count relay T3 through contacts TR3B. If the machine is stopped, the operator must then inspect the machine and correct its defects before restarting.

When off lead gears having either plus or minus helix angle error pass through the gear selector, the limit switch LS4 is closed or the limit switch LS5 is closed and the solenoid C is energized through timer relay TR7C contacts to open the gate 144 until the gear passes into the off lead chute 142. When undersize gears pass through the selector no limit switches are closed by the arms 102, 110, and the normal positions of the gates 144 and 152 guide the gear into the undersize chute 148 where the gear engages the limit switch LS3. When correctly dimensioned gears pass through the selector, closure of the limit swicth LS1 causes prolonged closing of the gate 152 through the energization of timer relay TR1 until the gear passes into the chute 146. Oversize gears close both limit switches LS1 and LS2 to operate solenoids A and B through the closure of the TR1A and TR2A contacts, respectively, thereby moving gate 154 to close off the undersize chute 148 and opening chute 150 to allow the gear to roll out the latter.

The count relay T2 is set for the number of rejects considered excessive for a given number of gears produced. The latter number is set on the count relay T1. The count relay T1 count coil is de-energized by the opening of the contacts LS3B of the limit switch LS3 every time an undersize gear is produced and by the opening of the contacts TR1B when correct or oversize gears are produced, thus counting all gears produced. The count coils of counter relays T2 and T3 are de-energized by undersize, oversize and off lead gears, respectively, by the opening of limit switch contacts LS3, the timer TR2D contacts, and the TR7B contacts. If count relay T2 counts out before the count relay T1 counts out, the count relay T1 is reset and the control relay CR is de-energized, thereby stopping the producing machine through the opening of the contacts CRO and lighting the light "R" through the closure of the contacts CRA. If count relay T1 counts out before the count relay T2 counts out, the count relay T1 resets the count relay T2 which, in turn, resets the count relay T1. The count relay T1, when reset, energizes the count relay T2 clutch coil which, in turn, energizes the count relay T1 clutch coil and the quality control or size control cycle is repeated.

The count relay T3 is set for the number of consecutive rejects of all types deemed excessive. As stated above, the clutch coil of the count relay T3 was energized by the closure of the main control relay CR contacts CRB. The count relay T3 count coil is energized each time a reject of any kind occurs. If an acceptable gear passes through the selector before the count relay T3 counts out, the relay TR1 contacts TR1A maintain energization of the relay TR3 which operates to reset the counter T3 and the cycle continues. If the T3 count relay counts out, the relay CR is de-energized by the opening of the contacts T3A, thereby stopping the machine. In this manner, the producing machine will be stopped when rejects of any character occur in consecutive order. This usually is a sign of incorrect machine setting, abnormal wear or actual breakage of cutting tools, incorrect boring of the gear blanks, or other defects not easily readjusted by automatic controls. For example, a supply of non-concentric gear blanks would stop the gear producing machine after only two or three non-concentric gears had been produced. These same size or quality controls, however, could be utilized to operate more complex machine readjusting controls, as, for example, a helix angle correcting means.

The cumulative acceptable and reject counters are, as noted above, visually-read electric counters which indicate the totals of all types of rejects and of all acceptable gears produced. The reject annunciator circuit also enables the operator to obtain a quick visual check on the step-by-step operation of each machine under his control, the relay CR6 extinguishing the lamps L1, L2 and L3 every time an acceptable gear is produced.

The gear size control is adapted to operate the reversible infeed "in-out" control motor 164 illustrated in Fig. 2, or other machine control feature, incorrectly-sized gears registering through limit switches LS2 and LS3, timer relay TR2, and control relays CR3, CR4, CR5 and CR6.

An initial under- or oversize gear will energize relays CR1 or CR2 by the closure of the contacts CR4B and CR5B, respectively. The relay CR1 or CR2 contacts CR1C and CR2B will energize the relay CR3 which establishes its own holding circuit through closure of the contacts CR3B, and which also opens the contacts CR3O to interrupt the producing machine cycle. If the succeeding gear is correctly dimensioned, the relay CR6A contacts open and de-energize the relay CR3 so the contacts CR3O close and reestablish the producing machine circuit to continue the cycle. If, however, the succeeding gear is undersize, the timer TR4 will be energized by the closure of the relay CR4 contacts CR4B. The timer TR4 energizes TR5 which stops the producing machine by opening contacts TR5O, and energizes the starter FD so that the feed motor 164 increases the center distance. The timer TR4 then de-energizes the timer TR5 and the starter FD. Closure of the contacts TR5B then energizes FU for a shorter period and the feed motor decreases the center distance by a lesser distance resulting in a net increase in the center distance. De-energization of the relay CR3 by the starter opening of the contacts FUA and the closing of the relay TR5O contacts at the end of its time period permits the machine cycle to resume. Further, if the succeeding gear is not undersize, but rather is oversize, the energization of the timer relay TR6 is effected by the timer TR2 contacts and the CR5 contacts and, when de-energized, the timer relay TR6 energizes the starter FU so that the feed motor decreases the center distance. De-energization of the relay CR3 by the starter contacts FUA and the closing of the timer TR6O contacts at the end of its time period permits the producing machine cycle to resume. The just-described gear size control circuit may be de-activated, when necessary, during setting-up of the producing machine, by opening the control selector switch 224.

The just-described electric controls system operated by the classifier illustrated in Figs. 3 and 4 thus inspects the entire toothed circumference of each gear and classifies the gears into four categories, that is, acceptable, undersize, oversize and off lead. This classification enables the reclaiming of oversize gears and the scrapping of undersize gears without further inspection, leaving only the off lead and oversize gears to be inspected for the purpose of determining whether they are reclaimable. Non-concentric gears with this arrangement show up in the undersize or oversize bin, where they may be examined with a view as to their reclaimability. An outstanding advantage of this embodiment of the invention is that off lead gears are detected and separately rejected so that they are not classified as undersize or oversize gears and the size control apparatus is not actuated. Likewise, consecutive non-concentric gears do not energize the size adjustment circuit because the consecutive reject count relay T3 stops the producing machine until the defect is remedied.

Figure 9:
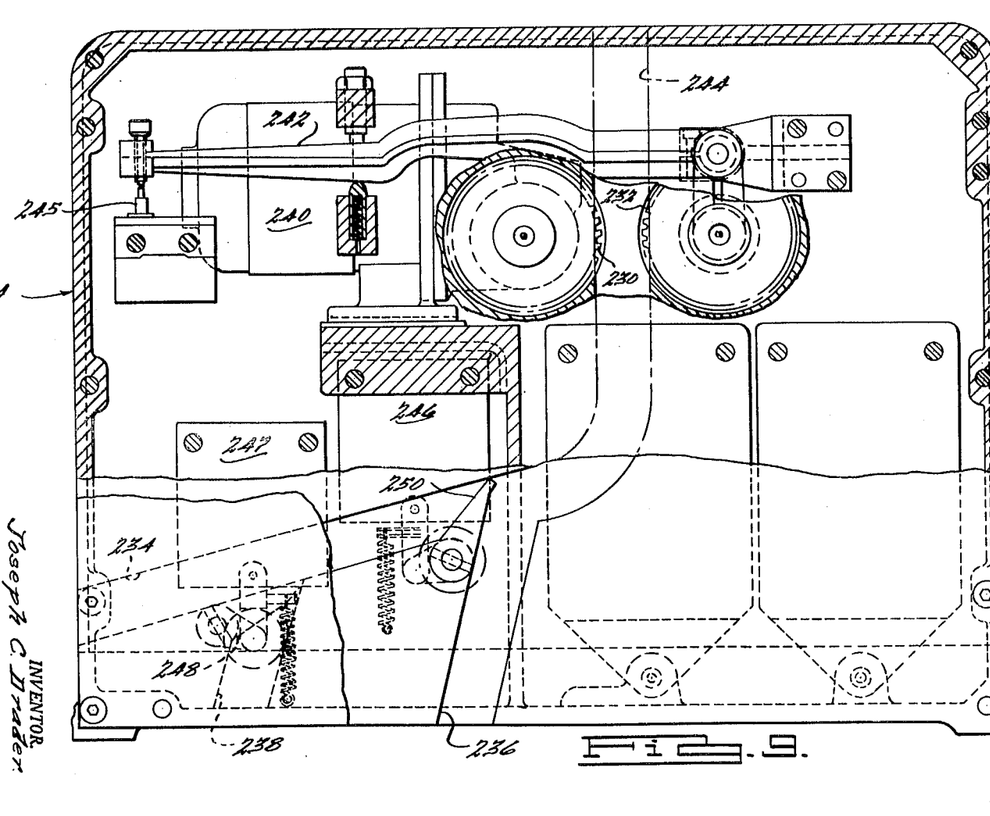
Fig. 9 is a front elevational view, with portions in section, of another embodiment of the invention.
Figure 10:
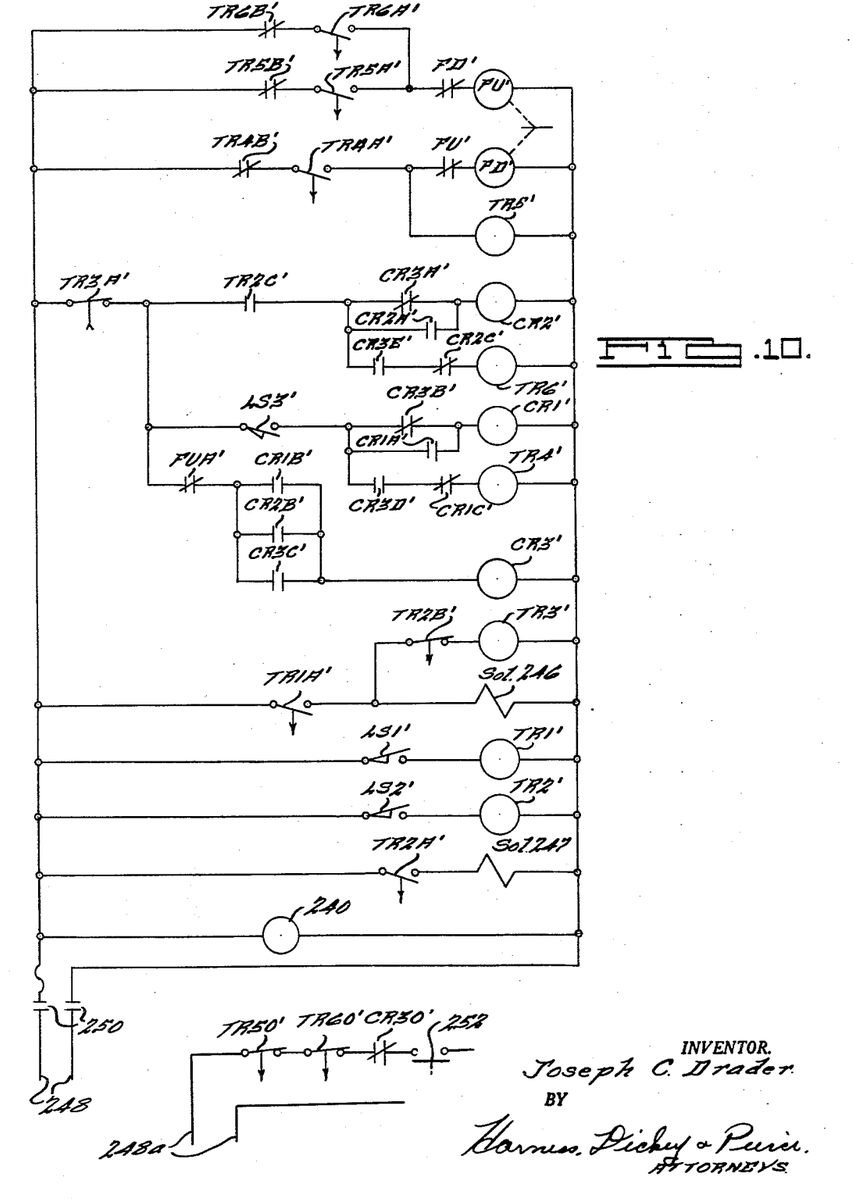
Fig. 10 is a schematic diagram of another embodiment of the control system.

Another embodiment of the invention is illustrated in Figs. 9 and 10. In Fig. 9, there is shown a gear classifier for use with size control only, this classifier being the subject of the applicant's copending application, Serial No. 446,238, now Patent No. 2,877,895, March 17, 1959, and assigned to the assignee of the present invention. The classifier illustrated in Fig. 9 includes a matched pair of master gears 230 and 232 to effect a three-way classification of sample gears as acceptable, undersize, and oversize. The acceptable gears leave the machine through a chute 234, the undersize gears through a chute 236, and the oversize gears through a chute 238. The master gear 230 is fixedly mounted and driven by an electric motor 240 while the master gear 232 is fixed against rotation and pivotally suspended from an arm 242 so as to move toward and away from the fixed master gear 230. Gear workpieces enter by gravity through a vertical chute 244 and engage the master gears. Since the gear 230 is driven and the gear 232 does not rotate, the gear workpieces will be rotated against the gear 232 and pass through between the master gears, meanwhile imparting pivotal movement to the switch arm 242. Movement of the arm 242 is registered by limit switches generally designated 245 located at a position near the end of the arm 242. The switches 245 actuate relays, and through solenoids 246 and 247 operate gates 248 and 250 which guide the sample gears into the chute 236 or the chute 238 to effect separation thereof.

In Fig. 10 a simplified electrical control circuit is schematically illustrated which is particularly adapted for use with the gear classifier shown in Fig. 9. This last-mentioned circuit is similar to that shown in Fig. 8 except that the off lead control, the reject annunciator circuit, and the visual cumulative acceptable and reject counters are eliminated. This circuit does, however, incorporate controls for the classifier and for a size control means for operation of, for example, the infeed "in-out" motor 164 illustrated in Figs. 5 to 7. As shown in Fig. 10, the circuit includes limit switches LS1', LS2' (switches 245 of Fig. 9), and limit switch LS3' disposed in the undersize reject chute 236; solenoids 246 and 247; timing relays TR1' to TR6', inclusive; and control relays CR1', CR2' and CR3'. The control circuit is connected to a suitable source of potential by leads 248, while the gear producing machine is energized through supply lines 248a connected to a suitable source of potential. The gear classifier motor 240 and the control circuit are energized by closing a switch 250. Contacts TR5O', TR6O' of the timer relays TR5' and TR6' and contacts CR3O' of the control relay CR3' are connected in series with a switch 252 of the monitored gear producing machine. When the switch 252 is closed, the producing machine begins to operate on an automatic cycle controlled by the control circuit, the gears produced entering the gear selector illustrated in Fig. 9, as described above.

The limit switch LS1' is connected to the coil of timer relay TR1', closure of LS1' causing contacts TR1A' to close and energize solenoid 246. Energization of the solenoid 246 causes the gate 250 to close to allow the gear to roll out the chute 234. Closure of the switch LS2' energizes timer relay TR2', and contacts TR2A' close and energize solenoid 247 to open the gate 248 and allow the sample gear to roll out the oversize chute 238. At the same time, contacts TR2B' open to de-energize timer relay TR3'; and contacts TR2C' close to energize relay CR2' through the normally-closed contacts CR3A'. Relay CR2' establishes its own holding circuit through contacts CR2A'. Closure of limit switch LS3' by an undersize gear energizes relay CR1' through normally-closed contacts CR3B', relay CR1' locking itself in through contacts CR1A'. Relay CR3' is energized by either of relays CR1' and CR2' through contacts CR1B' or CR2B', relay CR3' locking itself in through contacts CR3C'. Energization of relay CR3' opens contacts CR3O' and opens the gear producing machine circuit to stop the machine. Energization of relay CR3' energizes timer relay TR4' through contacts CR3D' and CR1C' and timer relay TR6' through contacts CR3E' and CR2C'. De-energization of the timer relay TR4' by the opening of the limit switch LS3', in turn, energizes and then de-energizes timer relay TR5' and starter FD' through contacts TR4A' and TR4B'. De-energization of the timer TR5' by the opening of contacts TR4A', in turn, energizes starter FU' (and de-energizes starter FD') through contacts TR5A' and TR5B'.

The successive energization and de-energization of the relay TR6' energizes and then de-energizes starter FU' through contacts TR6A' and TR6B'. Energization of starter FU' de-energizes relay CR3' by opening contacts FUA'. Closing of the TR6O' contacts then permits the machine cycle to continue.

The sequence of operations of the circuit of Fig. 10 is as follows. An undersize gear does not close either of the limit switches LS1' and LS2' so that the normal positions of gates 248 and 250 guide the gear into the chute 236. Limit switch LS3', however, will be closed to energize the control relay CR3' through the closure of the contacts CR1B', the relay CR3' then interrupting the gear producing cycle by opening the contacts CR3O'. A correctly dimensioned gear, on the other hand, closes limit switch LS1' energizing timer relay TR3' which causes prolonged energization of solenoid 246 to close gate 250 and allow the gear to roll out of the chute 234. An oversize gear closes both the limit switches LS1' and LS2' to close gate 250, the switch LS2' energizing the timer relay TR2' to energize solenoid 247 which opens the gate 248 to allow the gear to roll out the chute 238.

An initial over- or undersize gear will energize the relay CR2' or relay CR1' by closure of the contacts TR2C' or the closure of the limit switch LS3'. The relay CR1B' contacts or the relay CR2B' contacts energize the control relay CR3' to interrupt the gear producing cycle by opening the contacts CR3O'. If the succeeding gear is correctly dimensioned, the timer TR3' contacts TR3A' open and de-energize the relay CR3' to re-establish the producing circuit. If, however, the succeeding gear is undersize, the timer TR4' will be energized and then de-energized by the closure of the limit switch LS3'. Timer TR4' energizes timer TR5' and starter FD' and the feed motor 164 increases the center distance. Timer TR4' then de-energizes starter FD' and the timer TR5', and the timer TR5' then energizes starter FU' for a shorter time and the feed motor decreases the center distance by a lesser amount resulting in a net increase in center distance. De-energization of the relay CR3' by the opening of the starter FUA' contacts re-establishes the machine cycle.

If, on the other hand, the succeeding gear is oversize, the timer TR6' is energized by the closing of the contacts TR2C', TR6' de-energizing when the limit switch LS2' opens. The contacts TR6B' then close to energize the starter FU' and the feed motor 164 to decrease the center distance. Energization of the starter FU' opens the contacts FUA' to de-energize the control relay CR3' and the cycle continues.

Figure 11:
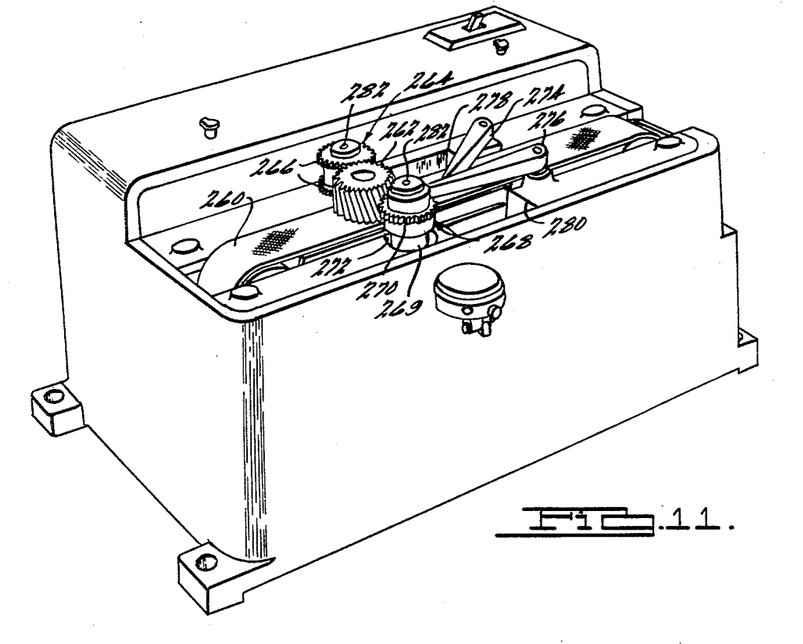
Fig. 11 is a perspective view of another embodiment of the invention.
Figure 12:
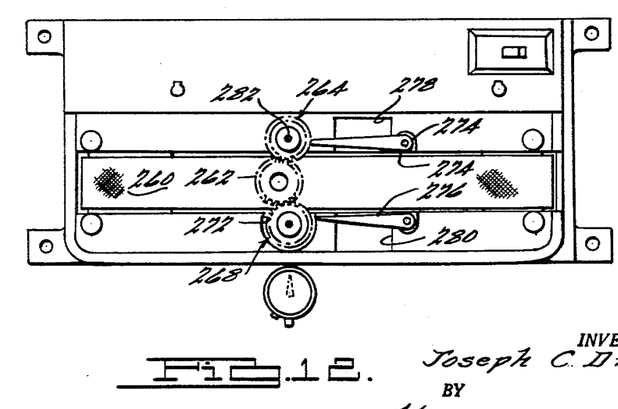
Fig. 12 is a plan view of the structure illustrated in Fig. 11.

In Figs. 11 and 12 there are shown a conveyor type gear classifier particularly adapted to receive wide face and cluster gears, although it will be understood that the classifier illustrated in Figs. 11 and 12 is applicable to other uses. In this embodiment of the invention, the gear workpieces are disposed in a conveyor belt 260. The conveyor belt 260 moves the gears into intermeshing contact with a pair of master gears 264 and 268. The gear 264 is a driving gear and has axially spaced relatively narrow gear face sections 266 while the gear 268 is pivotally mounted and fixed against rotations, the gear 268 having a relatively narrow face section 270 which is located between the separated faces 266 of the driving gear 264. With such a construction, engagement of the gear workpiece is facilitated with less likelihood of clashing and relatively wide face gears are supported at both ends so that they will not tip or jam upon initial contact and damage the master gears through faulty engagement. It is to be understood, however, that either master gear could have the split faces and either master gear could have the one gear face. If desired, a single wide faced master gear could be employed wtih a narrow faced gear to obtain adequate support.

The conveyor 260 drives the gears firmly into engagement with the driving gear 264, and, since the gear 264 is mounted for rotation and the gear 268 is fixed against rotation, the gear workpiece will be rotated in engagement with the pivoted fixed master gear 268 and advanced between the gears 264 and 268. The master gear 268 is pivotally supported on a shaft 269 which extends through an aperture 272, the shaft 269 having fixed thereto an arm (not shown) similar to arm 242 of the gear classifier illustrated in Fig. 9. The arm on the shaft 269 transmits the pivotal movement to micro limit switches effective to energize solenoids operatively connected to sweeper gates 274 and 276 disposed above the belt 260 on the discharge side of the master gears and normally parallel to the belt 260, as shown in Fig. 12. It will be understood that other electro-responsive devices may be actuated as a function of the movement of the gear 268. The gate 274 in Fig. 11 is shown to be operated so as to be in contact with gate 276 and disposed at an angle thereto. If the gear workpiece is undersize, the gate 274 in its position shown directs the gear into the undersize reject chute 278 (Fig. 12), the conveyor serving to move the gear along the gate 274 and into the chute. If the gear workpiece is oversize, the gate 276 is biased to a position closing off the undersize chute and at an angle which directs the gear into the oversize chute 280. If the sample gear is correctly dimensioned, the gates 274 and 276 remain parallel to the belt 260 so as to close off the chutes 278 and 280 and allow the gear to continue down the belt 260 to be delivered to a container or chute at the end thereof. The master gears 264 and 268 may be adjusted inwardly and outwardly to accommodate gears of a wide range of diameters, the master gears requiring changing only when the number, profile, lead angle and spacing of the teeth is to be changed. Changing of the master gears may be readily accomplished by loosening countersunk setscrews 282 and removing the gears.

While preferred embodiments of the invention have been shown and described, it will be understood that various changes and modifications may be made without departing from the spirit of the invention.

What is claimed is:

1. In combination with a gear producing machine, apparatus for adjusting said machine comprising gauge means including a master gear mounted for combined pivotal and translatory movement, means for conducting gear workpieces to intermeshing relationship with respect to said master gear, electro-responsive means responsive to the pivotal movement of said master gear for controlling said machine, electro-responsive means responsive to the translatory movement of said master gear for adjusting said machine, means for separating said gear workpieces as a function of measured dimensions of said gear workpieces, means for counting the number of workpieces having dimensions within a predetermined range, and means responsive to said counting means for controlling said machine.

2. Apparatus for gauging gear workpieces comprising, in combination, a master gear, means mounting said master gear for combined pivotal and translatory motion, means including an arbor for rotating a sample gear workpiece in intermeshing relationship with said master gear through at least one revolution of said gear workpiece, first electrical switch means responsive to the pivotal movement of said master gear, second electrical switch means responsive to the translatory movement of said master gear, electro-responsive means controlled by said first and said second switch means for separating said gears, electro-responsive counting means responsive to said first and said second switch means, and reversible electric motor means controlled by said second electrical switch means and by said counting means.

References Cited in the file of this patent

UNITED STATES PATENTS

| | | |
|---|---|---|
| 2,042,257 | Harrison et al. | May 26, 1936 |
| 2,043,012 | Schurr | June 2, 1936 |
| 2,073,917 | Zimmermann | Mar. 16, 1937 |
| 2,761,560 | Pomernacki | Sept. 4, 1956 |
| 2,803,342 | Gates | Aug. 20, 1957 |
| 2,815,579 | Bassoff | Dec. 10, 1957 |